(12) United States Patent
Breitbart et al.

(10) Patent No.: US 7,082,473 B2
(45) Date of Patent: Jul. 25, 2006

(54) SYSTEM AND METHOD FOR OPTIMIZING OPEN SHORTEST PATH FIRST AGGREGATES AND AUTONOMOUS NETWORK DOMAIN INCORPORATING THE SAME

(75) Inventors: Yuri J. Breitbart, Madison, NJ (US); Minos N. Garofalakis, Morris, NJ (US); Amit Kumar, Ithaca, NY (US); Rajeev Rastogi, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 895 days.

(21) Appl. No.: 09/775,329

(22) Filed: Feb. 1, 2001

(65) Prior Publication Data
US 2002/0147842 A1 Oct. 10, 2002

(51) Int. Cl.
  *G06F 15/173* (2006.01)
  *H04L 12/28* (2006.01)

(52) U.S. Cl. ............... 709/241; 709/238; 370/392
(58) Field of Classification Search ........ 709/238–241, 709/249, 200, 223, 224, 227, 232, 245; 370/238, 370/255, 389–392
See application file for complete search history.

(56) References Cited

U.S. PATENT DOCUMENTS

| | | | | |
|---|---|---|---|---|
| 5,291,477 A | * | 3/1994 | Liew | 370/238 |
| 6,016,306 A | * | 1/2000 | Le Boudec et al. | 370/235 |
| 6,256,675 B1 | * | 7/2001 | Rabinovich | 709/241 |
| 6,363,319 B1 | * | 3/2002 | Hsu | 701/202 |
| 6,587,684 B1 | * | 7/2003 | Hsu et al. | 455/419 |
| 6,633,544 B1 | * | 10/2003 | Rexford et al. | 370/238 |
| 2002/0078238 A1 | * | 6/2002 | Troxel et al. | 709/245 |

\* cited by examiner

*Primary Examiner*—Glenton B. Burgess
*Assistant Examiner*—Yasin Barqadle

(57) ABSTRACT

Systems and method for selecting open shortest path first (OSPF) aggregates and aggregate weights for a particular area. In one embodiment, an aggregate selecting system includes: (1) a database for containing data pertaining to candidate OSPF aggregates and corresponding weights and (2) an aggregate selector, associated with the database, that selects at least a subset of the OSPF aggregates such that the shortest path length between the particular source and destination subnets resulting from advertisement of a set of weighted aggregates approaches the shortest path length between the particular source and destination subnets irrespective of the advertisement. In one embodiment, a weight selection system includes: (1) a database for containing data pertaining to candidate OSPF aggregates and (2) a weight assigner, associated with the database, that assigns, for the OSPF aggregates, weights based on either an average distance of subnets in the area for a particular area border router (ABR) of the area or a search heuristic.

20 Claims, 9 Drawing Sheets procedure COMPUTEMINERROR(Aggregate $x$, Aggregate $y$, integer $l$)
1. if subTree[$x, y, l$].computed = true
2.     return [subTree[$x, y, l$].error, subTree[$x, y, l$].aggregates]
3. minError := minError1 := minError2 := $\infty$
4. if $x$ is a leaf {
5.     minError1 := $\sum_{s \in S} D(s,t) * (lsp(s, x, \{y\}, W_A) - lsp(s, x))$
6.     if $l > 0$
7.        minError2 := $\sum_{s \in S} D(s,t) * (lsp(s, x, \{x\}, W_A) - lsp(s, x))$
8.     if minError1 $\leq$ minError2
9.        [subTree[$x, y, l$].error, subTree[$x, y, l$].aggregates] := [minError1, $\emptyset$]
10.     else
11.        [subTree[$x, y, l$].error, subTree[$x, y, l$].aggregates] := [minError2, $\{x\}$]
12. }
13. if $x$ has a single child $u$ {
14.     [minError1, aggregates1] := COMPUTEMINERROR($u, y, l$)
15.     if $l > 0$
16.        [minError2, aggregates2] := COMPUTEMINERROR($u, x, l - 1$)
17.     if minError1 $\leq$ minError2
18.        [subTree[$x, y, l$].error, subTree[$x, y, l$].aggregates] := [minError1, aggregates1]
19.     else
20.        [subTree[$x, y, l$].error, subTree[$x, y, l$].aggregates] := [minError2, aggregates2 $\cup \{x\}$]
21. }
22. if $x$ has children $u$ and $v$ {
23.     for $i := 0$ to $l$ {
24.        [minError1, aggregates1] := COMPUTEMINERROR($u, y, i$)
25.        [minError2, aggregates2] := COMPUTEMINERROR($v, y, k - i$)
26.        if minError1 + minError2 < minError
27.           minError := minError1 + minError2
28.           aggregates := aggregates1 $\cup$ aggregates2
29.     }
30.     for $i := 0$ to $l - 1$ {
31.        [minError1, aggregates1] := COMPUTEMINERROR($u, x, i$)
32.        [minError2, aggregates2] := COMPUTEMINERROR($v, x, k - i - 1$)
33.        if minError1 + minError2 < minError
34.           minError := minError1 + minError2
35.           aggregates := aggregates1 $\cup$ aggregates2 $\cup \{x\}$
36.     }
37.     [subTree[$x, y, l$].error, subTree[$x, y, l$].aggregates] := [minError, aggregates]
38. }
39. subTree[$x, y, l$].computed := true
40. return [subTree[$x, y, l$].error, subTree[$x, y, l$].aggregates]

FIGURE 3 procedure COMBINEMINERROR()
1. for $i = 1$ to $m$
2.    for $j = 0$ to $k$ {
3.       $T_i[j]$.[error, aggregates] := COMPUTEMINERROR($r(T_i), \epsilon, j$)
4.       $X_i[j]$.[error, aggregates] := $[\infty, \emptyset]$
5.    }
6. for $j = 0$ to $k$
7.    $X_1[j]$.[error, aggregates] := $T_1[j]$.[error, aggregates]
8. for $i = 1$ to $m$
9.    for $j = 0$ to $k$
10.       for $l = 0$ to $j$
11.          if $(X_{i-1}[l]$.error $+ T_i[j - l]$.error $< X_i[j]$.error) {
12.             $X_i[j]$.error $= X_{i-1}[l]$.error $+ T_i[j - l]$.error
13.             $X_i[j]$.aggregates $= X_{i-1}[l]$.aggregates $\cup\ T_i[j - l]$.aggregates
14.          }

FIGURE 4

(b) $C_{jl} = \bar{x}_i$ (a) $C_{jl} = x_i$ procedure COMPUTEWEIGHTSCUMULATIVE()
1. for each $b \in B_i$ set $W_{min}(b) := 0$
2. for $i := 1$ to $r$ {
3.     $W := W_{min}$
4.     Choose a random subset $R \subseteq B_i$ of ABRs
5.     for each $b \in R$ set $W(b)$ to a random weight in $[0, L]$
6.     if $\sum_{s \in S} e(s, B(s, W)) < \sum_{s \in S} e(s, B(s, W_{min}))$
7.        $W_{min} := W$
8. }
9. return $W_{min}$

FIGURE 8 procedure ComputeWeightsMax(Q)

1. for each $b \in B_i$ set Wold(b) := 0
2. while (P$b_2$B i Wold(b) ≤ ( j$B_i$j*(j$B_i$j-1)

2 ) *lspmax) f3. Let

Q0 be a new set of inequalities that result when the value Wold(b) is substituted for each variable W (b) only on the LHS of each inequality in Q 4. Set Wnew(b) to the smallest possible value such that each inequality in Q0 is satisfied when Wnew(b) is substituted for variable W (b) in Q0 5. if Wnew = Wold 6. return Wnew 7. else 8. Wold := Wnew 9. g 10. return "there does not exist a weight assignment W "

FIGURE 9 procedure COMPUTEWEIGHTSTWOABR()
1. Set $V_{opt} := v(s_1)$, $E := E_{opt} := \sum_{s \in S} e(s, b_1)$
2. for $j := 1$ to $n$ {
3.     $E := E + e(s_j, b_2) - e(s_j, b_1)$
4.     if $E < E_{opt}$
5.         $V_{opt} := v(s_{j+1})$, $E_{opt} := E$
6. }
7. return $V_{opt}$

FIGURE 10

SYSTEM AND METHOD FOR OPTIMIZING OPEN SHORTEST PATH FIRST AGGREGATES AND AUTONOMOUS NETWORK DOMAIN INCORPORATING THE SAME

TECHNICAL FIELD OF THE INVENTION

The present invention is directed, in general, to network routing and, more specifically, to a system and method for optimizing open shortest path first (OSPF) aggregates and an autonomous network domain incorporating the system or the method.

BACKGROUND OF THE INVENTION

OSPF is a widely used protocol for routing within an autonomous system domain. OSPF implements a two-level hierarchical routing scheme through the deployment of OSPF areas. Each OSPF area consists of a collection of subnets interconnected by routers. Information about links and subnets within an area is flooded throughout the area. As a result, every router connected to an area knows the exact topology of the area—this includes the subnets and the links connecting routers in the area. However, details of an area's topology are not advertised beyond the area's borders and are thus hidden from other areas. Instead, subnet addresses within each area are aggregated and only aggregates are flooded into the rest of the network (thus, making an area's subnets reachable from the remainder of the network). This task of advertising aggregate information about subnets in an area is carried out by area border routers (ABRs), that is, routers attached to two or more areas.

OSPF areas and address aggregation enable OSPF to scale when networks contain hundreds or thousands of subnets. Specifically, they help to optimize router and network resource consumption, as follows:

1. Router memory. Routing tables only need to contain entries corresponding to aggregate addresses for areas not connected to the router. Only for areas directly connected to the router, are individual subnet addresses in the area stored in its routing table. This leads to smaller routing table sizes and thus lower memory requirements at routers.

2. Router processing cycles. The link-state database is much smaller since it only includes summary information for subnets belonging to areas that are not directly connected to the router. Consequently, the cost of the shortest-path calculation decreases substantially.

3. Network bandwidth. For subnets within each area, only aggregate address information (and not individual subnet addresses) is flooded into the rest of the network. As a result, the volume of OSPF flooding traffic necessary to synchronize the link-state databases is significantly reduced.

However, despite the above-mentioned benefits of address aggregation, trade-offs are involved. This is because address aggregation necessarily results in loss of information, which, in turn, can lead to suboptimal routing. In order to see this, one must examine in more depth how routing works in the presence of aggregation.

During routing, each ABR attaches a weight to each aggregate advertized by it. This weight is foundational for determining the path used by a router external to the area to reach subnets covered by the aggregate. From among all the ABRs advertizing the aggregate (with possibly different weights), the external router chooses the one (say b) for which the sum of the following two is minimum: (1) the length of the shortest path from the external router to the border router b, and (2) the weight advertized by b for the aggregate. IP packets from the external router to every subnet covered by the aggregate are thus forwarded along the shortest path from the external router to b and subsequently along the shortest path from b to the subnet. However, for a certain subnet, this path may be suboptimal since there may be a shorter path from the external router to the subnet through an ABR different from b. The following example, made with reference to FIG. 1, illustrates this problem.

FIG. 1 illustrates an exemplary autonomous network, generally designated 100. The network 100 is illustrated as having areas 0.0.0.0, 0.0.0.1, 0.0.0.2 and 0.0.0.3. The network 100 includes various routers 111, 112, 113, 114, 115, 116, 117, 118, 119 interconnecting subnets 121, 122, 123, 124, 125, 126, 127, 128. FIG. 1 also illustrates various subnet addresses and weights of each link connecting a pair of routers (e.g., routers 113, 115). The ABR $b_1$ 113 belongs to the area 0.0.0.1, the ABR $b_2$ 114 to te area 0.0.0.2, and the ABRs $b_3$ 115 and $b_4$ 116 to the area 0.0.0.3. Subnet addresses in the area 0.0.0.3 can be aggregated to different degrees. For instance, the aggregate 10.1.0.0/21 covers all the subnets in the area 0.0.0.3. In contrast, 10.1.4.0/22 covers only subnets 10.1.4.0/24, 10.1.5.0/24, 10.1.6.0/24 and 10.1.7.0/24, while 10.1.2.0/23 covers only subnets 10.1.2.0/24 and 10.1.3.0/24.

Suppose one of the aggregate addresses advertised by the ABRs of the area 0.0.0.3 is 10.1.4.0/22. Suppose further that each ABR assigns a weight to the aggregate which is essentially the distance of the furthest component in the aggregate from the router. Thus, router $b_3$ 115 advertizes 10.1.4.0/22 with a weight of 1100 (the distance of the subnet 10.1.6.0/24 from ABR $b_3$ 115), while the router $b_4$ 116 advertizes 10.1.4.0/22 with a weight of 1250 (the distance of the subnet 10.1.4.0/24 from the ABR $b_4$ 116). Thus, the ABR $b_1$ 114 belonging to the area 0.0.0.1 forwards all packets to the subnets in 10.1.4.0/22 through the ABR $b_3$ 115, since the shortest path to the aggregate through the ABR $b_3$ 115 has a length of 100+1100=1200, while the shortest path through the ABR $b_4$ 116 has length 200+1250=1450. Note, however, that the path from the ABR $b_1$ 114 to the subnets 10.1.6.0/24 and 10.1.7.0/24 passing through the ABR $b_3$ 115 has a length 1200 and is suboptimal. The shortest path from the ABR $b_1$ 114 to the subnets is through the ABR $b_4$ 116 whose length is only 400.

Further, note that considering different weight assignments for the aggregates does not alleviate the problem. The root of the problem is that a single ABR is selected by the ABR $b_1$ 114 for reaching all subnets in 10.1.4.0/22. If the ABR $b_4$ 116 is chosen instead of the ABR $b_3$ 115, then the paths from the ABR $b_1$ 114 to the subnets 10.1.4.0/24 and 10.1.5.0/24 through ABR $b_4$ 116 become much longer (whose length is 200+1250=1450) than the shortest paths to the subnets that pass through the ABR $b_3$ 115 (whose length is 100+50=150).

From the above example, it follows that address aggregation can potentially introduce an error in the optimal route calculation which is based on shortest paths. For instance, as illustrated in the example, when the aggregate address 10.1.4.0/22 is advertised with weights 1100 and 1250 by the ABRs $b_3$ 115 and $b_4$ 116, the router $b_1$ 111 selects the ABR $b_3$ 114 for the aggregate. This results in an error of 800 in the selected path from the ABR $b_1$ 114 to each of the subnets 10.1.6.0/24 and 10.1.7.0/24. The introduced error is essentially the difference between the length of the selected path (1200) and the length of the shortest path from the router $b_1$ 111 to each of the subnets (400). Note that the selected paths from the router $b_1$ 111 to the other two subnets 10.1.4.0/24 and 10.1.5.0/24 are the shortest paths, and so no error is introduced due to the subnets 10.1.4.0/24 and 10.1.5.0/24.

The primary reason for suboptimal paths being selected when subnets are aggregated is that a single weight is used by each ABR for all the subnets in the aggregate. A single weight may be incapable of accurately capturing the distance of the border router to every subnet covered by the aggregate. The problem is further exacerbated when the subnets are spread across the area with some subnets being closer to one border router while others being closer to a different border router. This was precisely the case in FIG. 1, where the aggregate 10.1.4.0/22 spans the subnets 10.1.5.0/24 (closer to the ABR $b_3$ 115) and 10.1.6.0/24 (closer to the ABR $b_4$ 116), the distance between whom is greater than 1000. As a result, a single weight advertized for aggregate 10.1.4.0/22 is not representative of the distance between a border router and subnets in 10.1.4.0/22.

Accordingly, what is needed in the art is a better way to select OSPF aggregates and their associated weights thereby to avoid suboptimization of routing in a network.

SUMMARY OF THE INVENTION

To address the above-discussed deficiencies of the prior art, the present invention provides systems and method for selecting open shortest path first (OSPF) aggregates and aggregate weights for a particular area. In one embodiment, an aggregate selecting system includes: (1) a database for containing data pertaining to candidate OSPF aggregates and corresponding weights and (2) an aggregate selector, associated with the database, that selects at least a subset of the OSPF aggregates such that the shortest path length between the particular source and destination subnets resulting from advertisement of a set of weighted aggregates approaches the shortest path length between the particular source and destination subnets irrespective of the advertisement. In one embodiment, a weight selection system includes: (1) a database for containing data pertaining to candidate OSPF aggregates and (2) a weight assigner, associated with the database, that assigns, for the OSPF aggregates, weights based on either an average distance of subnets in the area for a particular area border router (ABR) of the area or a search heuristic.

The present invention therefore introduces a better way to optimize transmission of data through a network. In one embodiment of the present invention, the aggregate selector selects the at least the subset such that the shortest path length between the particular source and destination subnets resulting from advertisement of a set of weighted aggregates approaches the shortest path length between the particular source and destination subnets irrespective of the advertisement.

In one embodiment of the present invention, the aggregate selector treats errors in the shortest path length as having unequal degrees of importance. In a related embodiment, the weight assigner treats errors in path lengths in the area as having unequal degrees of importance. In alternative embodiments, the degree of importance for each error is assumed to be equal.

In one embodiment of the present invention, the weight assigner employs a search heuristic to assign the weights. In a manner to be illustrated and described, the problem of assigning weights is shown to be $\mathcal{NP}$-hard. In such cases, a search heuristic is appropriate for determining weights.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3 illustrates a procedure ComputeMinError ( ) for computing aggregates that minimize tree error;

FIG. 4 illustrates a procedure CombineMinError ( ) for combining aggregates for a set of trees;

FIG. 8 illustrates a procedure ComputeWeightsCumulative ( ) for computing weights;

FIG. 9 illustrates a procedure ComputeWeightsMax ( ) for computing a W that satisfies Q; and FIG. 10 illustrates a procedure ComputeWeightsTwoABR ( ) for computing weights for two ABRs.

DETAILED DESCRIPTION

Referring initially to

Figure 1:
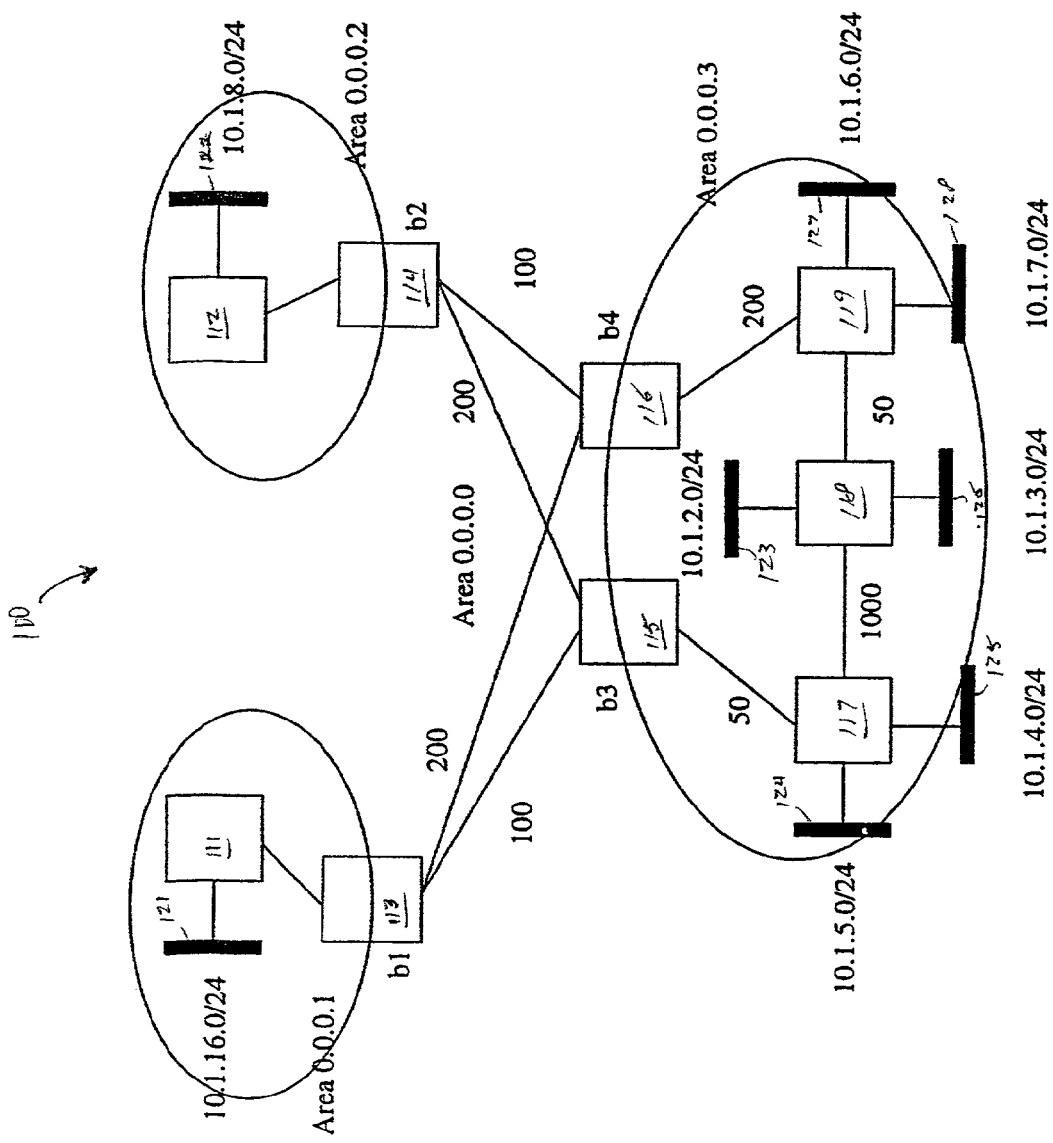
FIG. 1 illustrates an exemplary autonomous network.

The primary reason for suboptimal paths being selected when subnets are aggregated is that a single weight is used by each ABR for all the subnets in the aggregate. A single weight may be incapable of accurately capturing the distance of the border router to every subnet covered by the aggregate. The problem is further exacerbated when the subnets are spread across the area with some subnets being closer to one border router while others being closer to a different border router. This was precisely the case in the aforementioned example, where aggregate 10.1.4.0/22 spans subnets 10.1.5.0/24 (closer to $b_3$) and 10.1.6.0/24 (closer to $b_4$), the distance between whom is greater than 1000. As a result, a single weight advertized for aggregate 10.1.4.0/22 is not representative of the distance between a border router and subnets in 10.1.4.0/22.

One possible way to reduce the error due to the selection of suboptimal paths in the presence of aggregation is to avoid aggregating distant subnets that are close to multiple border routers. Thus, in the example set forth above in the Background of the Invention section, instead of advertizing a single aggregate 10.1.4.0/22, one can choose to advertize two aggregates 10.1.4.0/23 (with weights 50 and 1250 at $b_3$ and $b_4$, respectively) and 10.1.6.0/23 (with weights 1100 and 200 at $b_3$ and $b_4$, respectively) This reduces the error in the selected paths to 0. Thus, there is a trade-off between the number of aggregates advertized (and thus, the size of the routing table) and the error in the selected paths. Note that the aggregates advertized by border routers do not have to be disjoint. That is, for a pair of advertized aggregates, one may contain the other. In such a scenario, the longest match property of IP routing causes the more specific aggregate to take precedence for route computation to subnets within the aggregate. The following example illustrates how, by carefully selecting the aggregates as well as the associated weights, all the subnets in area 0.0.0.3 in the above example can be advertized using only two aggregates and incurring zero error.

Consider the autonomous network from FIG. 1. One way to ensure that the error in the selected paths to area 0.0.0.3's subnets is zero is to have the ABRs advertize the following three aggregates: 10.1.4.0/23, 10.1.2.0/23 and 10.1.6.0/23. The reason for this is that it is possible to choose weights for each aggregate at each border router such that the weight equals the distance of the border router to every subnet covered by the aggregate. For instance, for aggregate 10.1.2.0/23, weights of 1050 and 250 at border routers $b_3$ and $b_4$, respectively, reflect the exact distances of the border routers to subnets in it.

However, achieving zero error with only two aggregates is more challenging. Note that all the subnets in area 0.0.0.3 can be covered by the single aggregate 10.1.0.0/21—however, this aggregate by itself, cannot result in zero error. Another possibility is to consider the two disjoint aggregates 10.1.4.0/22 and 10.1.2.0/23 which cover all the subnets. However, as illustrated above, since subnets 10.1.4.0/23 and 10.1.6.0/23 covered by 10.1.4.0/22 are closer to different routers (and distant from each other), this cannot result in zero error either. Thus, the key to optimizing the error is to bundle 10.1.4.0/23 into one aggregate, and 10.1.2.0/23 and 10.1.6.0/23 into the other. It turns out that this can be achieved by advertizing the following two aggregates: 10.1.0.0/21 and 10.1.4.0/23. The longest match characteristic of IP routing causes the latter aggregate to be used for routing to subnets in 10.1.4.0/23 and the former to be used to route to subnets in 10.1.2.0/23 and 10.1.6.0/23.

One question still remains: what weights must be assigned to each aggregate? While this is straightforward for the aggregate 10.1.4.0/23 (since the two subnets 10.1.4.0/24 and 10.1.5.0/24 covered by it are at the same distance from any given border router), it is somewhat less obvious for the aggregate 10.1.0.0/21. Simply assigning the weight to be the distance of the most distant subnet may not result in the least error. To see this, suppose $b_3$ and $b_4$ advertize 10.1.0.0/21 with weights 1100 and 1250, respectively (the maximum distance to a subnet contained in the aggregate). This causes $b_1$ to select border router $b_3$ for subnets in 10.1.0.0/21, and the resulting cumulative error in the selected paths from $b_1$ to the subnets is $2*(150-150)+2*(1150-450)+2*(1200-400)=3000$. On the other hand, a lower cumulative error can be achieved if $b_3$ and $b_4$ advertize 10.1.0.0/21 with weights 730 and 570, respectively (the average distance to the subnets contained in the aggregate). In this case, $b_1$ selects border router $b_4$ to access subnets in 10.1.0.0/21, and the cumulative error is $2*(1450-150)+2*(450-450)+2*(400-400)=2600$, which is lower than the error for the earlier mentioned selection of weights.

Thus, configuring border routers $b_3$ and $b_4$ to advertize aggregates 10.1.0.0/21 and 10.1.4.0/23, $b_3$ with weights 730 and 50, and $b_4$ with weights 570 and 1450, causes the error to reduce to 0. This is because $b_1$ selects ABR $b_3$ for subnets in 10.1.4.0/23 and ABR $b_4$ for the remaining subnets (that is, subnets in 10.1.0.0/21 but not contained in 10.1.4.0/23). Thus, the selected paths after aggregation are indeed the shortest paths from $b_1$ to the subnets in area 0.0.0.3.

From the above examples, it follows that the two important problems related to address aggregation in OSPF are the following: (1) selection of the aggregates to advertize at each ABR, and (2) assignment of weights to each advertized aggregate at each ABR. These two problems are addressed separately. First, for a given k and a given assignment of weights to each aggregate, a dynamic programming technique is presented to compute the k best aggregates to advertize such that the cumulative/maximum error in the selected paths between source destination subnets is minimized. This problem is relevant when there is a limit on the number of aggregates that can be advertized in order to bound the routing table sizes, number of entries in the link-state database or the amount of network traffic due to OSPF advertizements. The objective then is to choose the k aggregates to advertize such that the selected paths are as close to the shortest paths as possible. The technique of the present invention can be extended to solve variants in which the minimum number aggregates is desired to be computed so that the error in selected paths is less than a certain user-specified threshold.

Later, the problem of choosing weights for each aggregate at each ABR such that the deviation of selected paths from the shortest paths is minimized is addressed. Specifically, the following problem is solved: for each aggregate, determine an assignment of weights to the aggregate at each ABR such that the error in the selected paths between source destination subnets is minimum. While for certain restricted cases, the above problem can be solved in polynomial time, the general problem itself is $\mathcal{NP}$-hard. Search heuristics are presented for selecting weights for both the cumulative error as well as the maximum error minimization cases.

System Model and Problem Formulation

The network is modeled as an undirected graph. Nodes in the graph correspond to either routers or subnets. Edges in the graph connect routers with other routers or subnets. A link exists between two routers if the two routers can directly exchange IP packets without going through an intermediate router (that is, the two routers are either connected to the same subnet or are connected by a point-to-point link). A link exists between a subnet and a router if the subnet is connected to the router. Each link has an associated weight, which is the OSPF weight assigned to the link (that is, the interface to which the link is connected to). For simplicity, it is assumed that the link is assigned the same weight at both ends—the techniques, however, are applicable even if link weights are not symmetric. Table 1 describes the notation employed herein.

TABLE 1

| Symbol | Description |
|---|---|
| k | Number of aggregates to be selected |
| s, t | Source, destination subnets |
| R | Set of OSPF areas |
| $R_i$ | Generic term for OSPF area |
| S | Set of all subnets in autonomous system domain |
| $S_i$ | Set of subnets in area $R_i$ |
| B | Set of all ABRs |
| $B_i$ | Set of ABRs for area $R_i$ |
| b, c | Generic letters for an ABR |
| A | Set of aggregates eligible for advertising in area $R_i$ |
| $A_i$ | Set of aggregates eligible for advertising in area $R_i$ |
| x, y | Generic letters for advertized aggregates |
| X, Y | Generic letters for sets of advertized aggregates |

TABLE 1-continued

| Symbol | Description |
|---|---|
| $D_{s,t}$ | Degree of importance of the source destination subnet pair |
| $W_x$ | Weight assignment function for aggregates in X |
| lst (s, t) | Length of shortest path between subnets s and t |
| lst (s, t, X, $W_x$) | Length of shortest path between subnets s and t when aggregates in X are advertized with weights in $W_x$ |

The set of subnets S in the network is partitioned into disjoint areas. The set of areas is denoted by R and the set of subnets in area $R_i \in R$ are denoted by $S_i$. A router is said to be attached to area $R_i$ if it is directly connected to a subnet in $S_i$. A router that is attached to two or more areas is called an area border router (ABR). $B_1$ is the set of ABRs attached to area $R_i$. In addition to area $R_1$ (and possibly other areas), every ABR in $B_i$ is also attached to a special backbone area. The backbone area serves to connect the subnets in the various other areas. lsp(s,t) denotes the length of the shortest path between s and t. Here, if s and t belong to the same area $R_i$, then the shortest path between s and t is defined to be over links in area $R_i$. In case s and t belong to distinct areas $R_i$ and $R_j$, respectively, the shortest path between s and t involves two ABRs $b \in B_1$ and $c \in B_j$, and consists of three path segments: the first is the shortest path between s and b involving links in $R_i$, the second is the shortest path between b and c over links in the backbone area and the final segment is the shortest path between c and t all of whose links belong to area $R_j$. Note that lsp can be defined in a similar fashion if either of the subnets s and t above are replaced by routers.

In OSPF, information relating to links and subnets in an area are flooded throughout the area. Consequently, routers attached to area $R_i$ have detailed knowledge of $R_i$'s topology. As a result, IP packets originating in any subnet s belonging to area $R_i$ destined to a subnet t in the same area are forwarded along the shortest path between s and t. However, in order to ensure smaller routing table sizes and reduce network traffic overhead, detailed information about individual subnets within an area are typically not be advertized beyond the area's borders. Instead, area $R_i$'s ABRs will typically be configured to advertize a set of aggregates X that cover subnets in $S_i$ and a separate weight for each aggregate in X. $W_x(x,b)$ denotes the weight assigned to an aggregate $x \in X$ by ABR $b \in B_i$. Each ABR in $B_i$ floods in the entire backbone area, every aggregate $x \in X$ along with the weight assigned to x by it; this causes ABRs belonging to every other area to receive x. An ABR $c \in B_j$, in turn, floods x into area $R_j$ with an adjusted weight equal to $\min_{b \in B_i}\{lsp(b,c)+W_x(x,b)\}$. Thus, a subnet s in $S_j$, in order to reach aggregate x that covers subnets in $S_1$ selects a path passing through ABR $b \in B_i$ for which $lsp(s,b)+W_x(x,b)$ is minimum.

Note that, due to the longest match property of IP routing, the most specific aggregate covering a subnet determines the path to the subnet. An aggregate x is said to be more specific than an aggregate y if x is contained in y, which $x \in y$ denotes. Thus, for a subnet t in $S_i$, if x is the most specific aggregate in X that covers t, then a subnet s in $S_j$, in order to reach t, selects the path comprising of the shortest path from s to b and then from b to t, where $b \in B_j$ is the ABR for which $lsp(s,b)+W_x(x,b)$ is minimum. $lsp(s,t,X,W_x)$ denotes the length of this selected path from s to t for the set of advertized aggregates X and weight assignment $W_x$. Thus, $lsp(s,t,X,W_x)=lsp(s,b)+lsp(b,t)$, and the error in the selected path is simply $lsp(s,t,X,W_x)-lsp(s,t)$. When s and t belong to the same area, $lsp(s,t,X,W_x)$ is defined to be equal to $lsp(s,t)$. Note that $lsp(s,t,X,W_x)=\infty$ if X does not contain an aggregate that covers t (the implication here is that t is unreachable from s).

Further addressed is the problem of computing the set of aggregates X advertized across all the areas and the weight assignment function $W_X$ such that the error in the selected paths is minimized. Note that certain restrictions on X and $W_X$ need to be imposed to ensure the reachability of remote subnets in a different area. First, X should be complete, that is, every subnet in S should be covered by some aggregate in X. The next two restrictions serve to ensure that an ABR cannot advertize an aggregate covering a subnet in $S_i$ unless it belongs to $B_i$. An aggregate x is eligible if all the subnets in covered by it belong to a single area. Thus, in the autonomous network of FIG. 1, aggregate 10.1.0.0/21 is eligible, since it only covers subnets in area 0.0.0.3; however, aggregate 10.1.0.0/20 is not, since it covers subnets 10.1.8.0/24 and 10.1.4.0/24 that belong to different areas. Let A denote the set of all eligible aggregates such that every aggregate in A covers at least one subnet in S. Note that $S \subseteq A$. Further, let Ai $\subseteq$ A denote the set of eligible aggregates that cover subnets in $S_i$. For purposes of the illustrated embodiment, it is required that the set of advertised aggregates $X \subseteq A$. Further, it is required that only ABRs in $B_i$ advertize aggregates in $A_i$. One way to model this is by requiring that $W_X(x,b)=\infty$ if $x=A_i$ and $b \notin B_i$.

Now, two problems to be addressed herein may be set forth.

1. Aggregate selection problem: Given a k and a weight assignment function $W_A$, compute a complete set $X \subseteq A$ containing at most k aggregates such that $lsp(s,t,X,W_X)-lsp(s,t)$ is minimum.
2. Weight selection problem: For an aggregate $x \in A_i$, compute a weight assignment function $W_{\{X\}}$ such that $\Sigma_{s,t \in S \in X}(lsp(s,t,\{X\}, W_{\{X\}})-lsp(s,t)$ is minimum.

Note that in the above-mentioned two problems, every source destination subnet pair is assigned the same degree of importance. In other words, in the final error, the error in the selected path between every subnet pair is treated equally, that is, given an equal degree of importance. However, this is somewhat restrictive since minimizing the error in the selected paths for certain source destination subnets may be more important. This may happen, for instance, for subnet pairs between which there is a disproportionately high volume of traffic, or subnet pairs carrying high-priority or delay-sensitive traffic like voice. Thus, one can consider a "degree of importance" function D which for a pair of subnets s,t returns a real value D(s,t) that reflects the importance of minimizing the error in the selected path between subnets s and t. Note that D(s,t) can be any arbitrary function of the volume/priority of traffic flowing between subnets s and t. Subnet pairs for whom the error in the selected path does not matter (either due to very low traffic volume or due to low priority data traffic) can be assigned low values for D(s,t) or even zero. The generalized aggregate and weight selection problems incorporating the degrees of importance are then as follows.

1. Generalized aggregate selection problem: Given a k and a weight assignment function $W_A$, compute a complete set $X \subseteq A$ containing at most k aggregates such that $\Sigma_{s,t \in S}D(s, t)*(lsp(s,t,X,W_A)-lsp(s,t))$ is minimum.
2. Generalized weight selection problem: For an aggregate $x \in A_i$, compute a weight assignment function $W_{\{X\}}$ such that $\Sigma_{s,t \in S}D(s,t)*(lsp(s,t,X,WA)-lsp(s,t))$ is minimum.

In the above problem formulations, the cumulative error across all source destination subnet pairs is attempted to be minimized. An alternative problem of interest is to minimize the maximum error across all the source destination subnets. This formulation is similar to the above described problems except that instead of minimizing $\Sigma_{s,t \in S}()$ the objective is to minimize $\max_{s,t \in S}()$.

Generalized Aggregate Selection Problem

This section presents a dynamic programming technique for the generalized aggregate selection problem. The technique of the present invention exploits the fact that the containment structure of aggregates in A is a set of trees. Defined is the notion of error for each tree when certain aggregates in it are chosen, and shown is the cumulative error of the selected paths when a set of aggregates X is advertized is equal to the sum of the errors of the trees when aggregates in X are selected in them. Next presented is a dynamic programming technique for selecting k aggregates in a single tree that minimize its error. Then, a technique for combining the results for the collection of trees to derive the final k aggregates that yield the minimum error is set forth. Finally, set forth is how the techniques of the present invention can be extended for minimizing the maximum error.

Aggregate Trees

Figure 2:
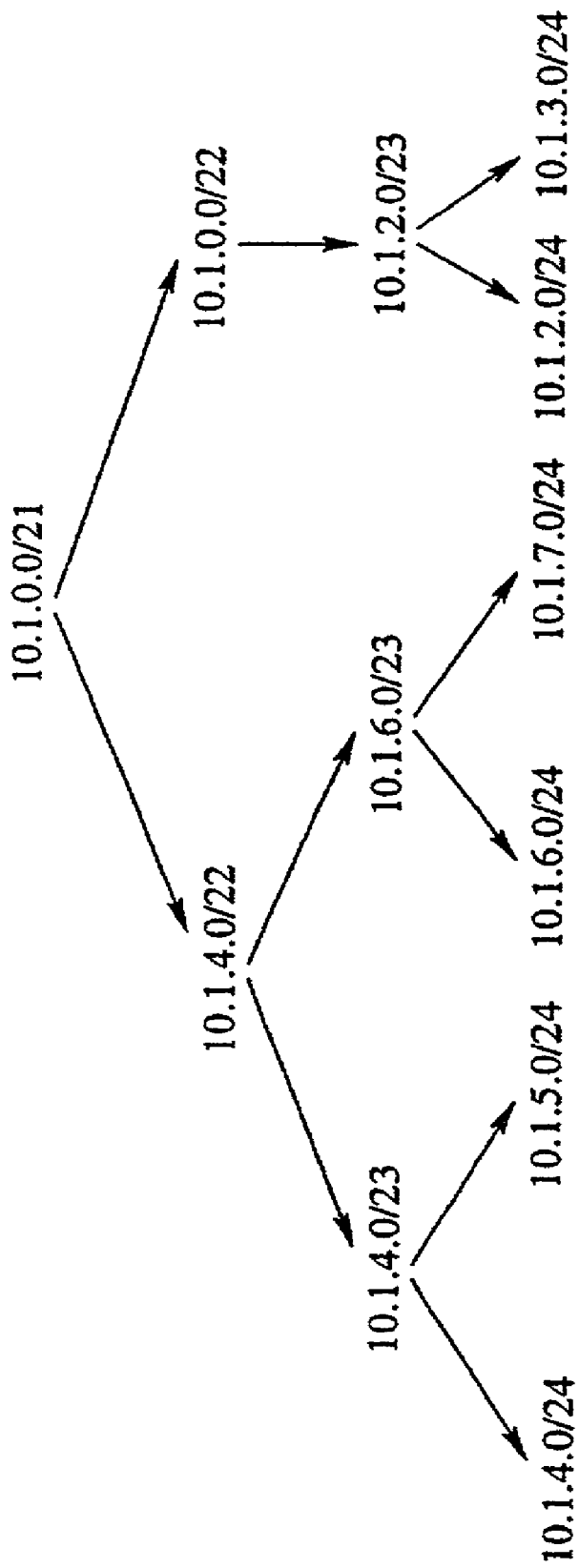
FIG. 2 illustrates an aggregate tree for eligible aggregates covering subnets in area 0.0.0.3.

The containment relationship among the eligible aggregates in A naturally form a set of trees. For aggregates x,y∈A, an edge from x to y exists if x covers y and every other aggregate z∈A that covers y also covers x. FIG. 2 illustrates an aggregate tree for the eligible aggregates that cover subnets in area 0.0.0.3 (from FIG. 1). Observe that since A contains aggregates 10.1.4.0/22, 10.1.6.0/23 and 10.1.7.0/24, there is an edge from 10.1.6.0/23 to 10.1.7.0/24; however, there is no edge from 10.1.4.0/22 to 10.1.7.0/24 in the tree. Also, the internal nodes in the aggregate tree have either one or two children, but no more than two children. For instance, in FIG. 2, 10.1.0.0/22 has only one child since 10.1.0.0/23 does belong to A (subnet 10.1.1.0/24 does not exist in the network). Note that each leaf of an aggregate tree is a subnet in S. Further, the root r(T) of tree T is basically an aggregate that is not covered by any other eligible aggregate.

Next defined is the error of a tree T when a set of aggregates in it have been selected. Suppose x is an aggregate in the tree T,y is the most specific selected aggregate covering x in the tree, and X is the set of selected aggregates. The error of the subtree rooted at x is recursively defined as follows:

$$E(x, y, X, W_A) = \begin{cases} \sum_{(x,u) \in T} E(u, y, X, W_A) \\ \sum_{(x,u) \in T} E(u, x, X, W_A) \\ \sum_{s \in S} D(s, t) * (lsp(s, x, \{y\}, W_A) - lsp(s, x)) \\ \sum_{s \in S} D(s, t) * (lsp(s, x, \{x\}, W_A) - lsp(s, x)) \end{cases}$$

The first condition applies if x has children and x∈X.
The second condition applies if x has children and x∉X.
The third condition applies if x has a leaf and x∈X.
The fourth condition applies if x has a leaf and x∉X.

The error for an entire tree T with the set of selected aggregates X is then simply $E(r(T), \epsilon, X, W_A)$ ($\epsilon$ denotes the empty aggregate that does not cover any other aggregate) Note that each recursive invocation of E on x's children propagates x as the most specific selected aggregate if x∈X. Consequently, whenever E is invoked for the subtree rooted at an aggregate, x,y is always the most specific selected aggregate covering x. As a result, the error of a tree is simply the sum of the errors of all the leaf subnets in it, where the error of a subnet t is $\Sigma_{s \in S} D(s,t)*(lsp(s,t,\{y\},W_A)-lsp(s,t))$, where y is the most specific aggregate in X that covers t. Thus, since every subnet in S is contained in one of the trees, the sum of errors of all the trees is essentially the cumulative error in the selected paths, which is the metric that should be minimized.

Thus, the aggregate selection problem has been reduced to the problem of computing a set X containing at most k aggregates such that the sum of the errors of all the trees is minimum. This is then broken into two subproblems that will now be addressed. A dynamic programming technique is first presented to compute for a single tree the set of aggregates X containing at most k aggregates such that the error of the tree is minimum. Then, the computed aggregates that minimize the error of each tree are shown how to be combined to yield the set of aggregates the minimize the error of the entire collection of trees.

Computing Optimal Aggregates for a Single Tree

A set of recursive equations is now presented for computing a tight lower bound on the error of a tree assuming that at most k arbitrary aggregates in the tree can be selected. The equations form the basis of a dynamic programming technique that can be used to compute the k best aggregates to select in order to minimize the error of the tree. Suppose that x is an aggregate in the tree T and y is the most specific aggregate in the tree covering x that has already been selected. Then, the minimum error of the subtree rooted at x if at most k aggregates in the subtree may be chosen, is as follows.

$$minE(x, y, k, W_A) =$$

$$\begin{cases} E(x, y, \phi, W_A) & \text{if } k = 0 \\ \min\{minE(u, y, k, W_A), minE(u, x, k-1, W_A)\} & \text{if } k > 0 \text{ and } x \text{ has a single child } u \\ \min\{\min_{0 \le i \le k} \{minE(u, y, i, W_A) + minE(v, y, k-i, W_A)\}, \\ \min_{0 \le i \le k-1} \{minE(u, x, i, W_A) + minE(v, x, k, -1-i, W_A)\}\} & \text{if } k > 0 \text{ and } x \text{ has children } u, v \\ \min\{E(x, y, \phi, W_A), E(x, y, \{x\}, W_A)\} & \text{if } k > 0 \text{ and } x \text{ is a leaf} \end{cases}$$

The intuition underlying the above set of equations is that if k=0, then, since no aggregates in the subtree can be selected, the minimum error is simply the error of the subtree when no aggregates in it are chosen. In case k>0 and x has children, and if X is the set of aggregates in the subtree rooted at x that if selected result in the minimum error, then the following hold for X: (1) either x∈X or x∉X, and (2) of the remaining aggregates in X, i are in the subtree rooted at its left child and the remaining k−i or k−i−1 aggregates (depending on whether x∈X) are in the subtree rooted at its right child. Thus, since the error of the subtree with x as root is simply the sum of the errors of its left and right subtrees, the minimum error can be computed for (the subtree rooted at) x by first computing the minimum error of its left and right subtrees for 0≦i≦k selected aggregates and for the cases when x is either selected or not selected, and then choosing the combination with the smallest error. Finally, if k>0 and x is a leaf, then there are only two possible alternatives for selecting aggregates in x's subtree: either to select x or not to select x. The minimum error for these two cases then yields the desired minimum error.

Theorem 1: $minE(x,y,k,W_A)$ is equal to the minimum of $E(x,y,k,W_A)$, where X is any arbitrary set containing at most k aggregates in the subtree rooted at x.

From Theorem 1, it follows that $minE\ (r(T),\epsilon,k,W_A)$ returns the minimum possible error for a tree T when at most k aggregates in the tree can be selected. Procedure ComputeMinError in FIG. 3 uses dynamic programming to compute the k aggregates that result in the minimum possible error for the subtree rooted at x and y is the most specific aggregate covering x that has already been selected. The procedure is invoked with arguments that include the root aggregate of the tree r(T), ε and k. The key ideas are similar to those described earlier for the computation of minE, the minimum error for the tree. For instance, if an aggregate x has children, then procedure ComputeMinError (x,y,l) recursively invokes itself for each of its children for the cases when x is selected and when x is not selected. Furthermore, in the case that x has two children, the procedure is invoked for each child for all the possibilities for the number of aggregates in each child subtree.

The only difference is that in addition to the minimum error, the procedure also computes the aggregates that are responsible for minimizing the tree error. Thus, every invocation of procedure ComputeMinError, in addition to returning the minimum error for the subtree rooted at x, also returns the set of aggregates in the subtree that cause the error to be minimum. This set is derived by taking the union of the optimal aggregates for the subtrees rooted at its children, and adding {x} to it if selecting x is required for minimizing the error (steps 11, 20 and 35). Note also that in order to improve computational efficiency, the optimal aggregates and the minimum error for the subtree rooted at x with y as the most specific aggregate and at most l selected aggregates are stored in subTree[x,y,l].aggregates and subTree[x,y,l].error, respectively. The first invocation of ComputeMinError (x,y,l) causes the body of the procedure to be executed, but subsequent invocations simply return the previously computed and stored values.

Combining the Aggregates for Set of Trees

Suppose there are m aggregate trees $T_1, T_2, \ldots, T_m$. Further, let $T_l[j]$. [error, aggregates] denote the minimum error and the set of at most j aggregates in $T_l$ responsible for minimizing $T_l$'s error. Then, $X_i[j]$ . [error, aggregates], the minimum error for the set of trees $T_1, \ldots, T_l$ and the j aggregates that minimize their cumulative error can be computed using the result of the following theorem.

Theorem 2: For the set of trees $T_i, \ldots, T_m$, $$X_i[i] \cdot \text{error} = \begin{cases} Ti[j] \cdot \text{error} & \text{if } i = 1 \\ \min_{0 \leq l \leq j} \{X_{i-1}[l] \cdot \text{error} + T_i[j-l] \cdot \text{error} & \text{otherwis} \end{cases}$$

Procedure CombineMinError in FIG. 4 computes in $X_m[k]$. [error, aggregates] the minimum cumulative error and the k aggregates that minimize the error for the trees $T_l, \ldots, T_m$. After computing the error and aggregates for each individual tree in steps 1–5, in each iteration of steps 8–14, the $X_i[j]$'s are computed for increasing values of l based on the individual tree errors and the $X_i[j]$'s computed in the previous iteration (as stated in Theorem 2). For each $X_i[j]$, the aggregates are computed by taking the union of the aggregates for the $X_{i-l}[l]$ and $T_i[j-1]$ that result in the minimum error for $X_i[j]$.

Time and Space Complexity

Suppose that d is the maximum depth of an aggregate tree, the number of aggregates in A is N and the number of subnets in S is n. Note that for 32-bit IP addresses, d≦32. Then the time complexity of the procedure ComputeMinError can be shown to be $O(n^3+Ndk^2)$. The reason for this is that lsp (s,t), the shortest path between subnets s and t needs to be computed for all subnet pairs. The time complexity of this step is $O(n^3)$. Also, for each subnet x and every aggregate y covering it, one can precompute and store $\Sigma_{s\in S}D(s,t)*(\text{lsp}(s,x,\{y\}, W_A)-\text{lsp}(s,x))$, thus enabling this information to be accessed in constant time. Further, the body of ComputeMinError is executed at most once for each combination of x, y and l. For a specific x, there are at most dk different possibilities for y and l for which the body of the procedure is executed. This is because y has to be an ancestor of x in the tree and 1≦k. Each execution of the body of ComputeMinError makes at most $2^l+1$ recursive calls, and thus, since there are N possible aggregates, the total number of times ComputeMinError is invoked is $O(Ndk^2)$. As a result, the time complexity of procedure ComputeMinError is $O(n^3+Ndk^2)$. Further, the space complexity of the procedure is $O(n^2+Ndk)$, $O(n^2)$ to store the shortest path and error information for subnets, and O(Ndk) to store the error and aggregate values for each of the $Ndk^2$ possible combinations of values for x, y and l.

It is fairly straightforward to observe that the three for loops spanning steps 8–14 of procedure CombineMinError execute $O(mk^2)$ steps. Thus, the overall time complexity of the procedure is $O(n^3+Ndk^2+mk^2)$, where the first two terms are the time complexity of computing the aggregates that minimize the error for the m trees. Note that even though CombineMinError makes independent successive invocations to ComputeMinError (r(Ti),ε,j) for j=0, . . . , k, the results computed in subTree during an invocation are shared between the invocations. The space complexity of procedure CombineMinError is simply O(mk) to store the $X_i$ and $T_i$ arrays.

Minimizing Maximum Error

Note that instead of minimizing the cumulative error over source destination subnet pairs, the techniques set forth herein can be adapted to minimize the maximum error over source destination pairs. In order to do this, the error of a tree should be redefined to be the maximum error of the leaf subnets in it (instead of the sum of errors). Thus, the recursive definition of the error of the subtree rooted at x given that y is the most specific selected aggregate covering x in the tree and X is the set of selected aggregates, is as follows:

$$E(x, y, X, W_A) = \begin{cases} \max_{(x,u)\in T} E(u, y, X, W_A) \\ \max_{(x,u)\in T} E(u, x, X, W_A) \\ \max_{s\in S} D(s, t) * (lsp(s, x, \{y\}, W_A) - lsp(s, x)) \\ \max_{s\in S} D(s, t) * (lsp(s, x, \{x\}, W_A) - lsp(s, x)) \end{cases}$$

The first condition applies if x has children, and x∉X.
The second condition applies if x has children, and x∈X.
The third condition applies if x is a leaf and x∉X.
The fourth condition applies if x is a leaf and x∈X.
Further, the minimum error of the subtree rooted at x if at most k aggregates in the subtree can be chosen (given that y is the most specific aggregate in the tree covering x and that has already been selected), is as follows:

$$minE(x, y, k, W_A) =$$

$$\begin{cases} E(x, y, \phi, W_A) & \text{if } k = 0 \\ \min\{minE(u, y, k, W_A), minE(u, x, k-1, W_A)\} & \text{if } k > 0 \text{ and } x \text{ has a single child } u \\ \min\{\min_{0\leq i\leq k} \{minE(u, y, i, W_A) + minE(v, y, k-i, W_A)\}, \\ \min_{0\leq i\leq k-1} \{minE(u, x, i, W_A) + minE(v, x, k, -1-i, W_A)\}\} & \text{if } k > 0 \text{ and } x \text{ has children } u, v \\ \min\{E(x, y, \phi, W_A), E(x, y, \{x\}, W_A)\} & \text{if } k > 0 \text{ and } x \text{ is a leaf} \end{cases}$$

Note that, unlike the cumulative error case, where one was interested in the distributing the aggregates amongst the subtrees of x rooted at children u and v so that the sum of the errors of the subtrees was minimized, for the maximum error case, one is now interested in minimizing the maximum of the errors of the two subtrees (since the error of the subtree rooted at x is the maximum of the errors of its two child subtrees). Thus, the following modifications need to be made to procedure ComputeMinError to compute the k aggregates that minimize the (maximum) error for the tree: (1) replace $\Sigma_{s\in S}D(s,t)*(lsp(s,x,\{y\},W_A)-lsp(s,x))$ in steps 5 and 7 by $\max_{s\in S}D(s,t)*(lsp(s,x,\{y\},W_A)-lsp(s,x))$, and (2) replace minError1+minError2 in steps 26, 27, 33 and 34 with max{minError1, minError2}. Similarly, the following simple modification to procedure CombineMinError enables it to compute the minimum error of a set of trees for the maximum error case: replace $X_{i-1}[1].error+T_i[j-1].error$ error in steps 11 and 12 by $\max\{X_{i-1}[1].error, T_i[j-1].error\}$.

Weight Selection Problem

In the previous section, for a given weight assignment function $W_A$, techniques were set forth for computing the optimal set of aggregates X for which the error in the selected paths is minimized. However, the final error and set of optimal aggregates X are very sensitive to the weight that a border router advertizes for each aggregate. Thus, the weight assignment problem is important for ensuring that selected paths are of high quality, and is the subject of this section.

Recall that the weight assignment problem is to compute a weight assignment function $W_{\{x\}}$ for a single aggregate x∈$A_j$ such that the error in the selected paths from all subnets to destination subnets covered by x is minimized. The weight assignment function $W_{\{x\}}$ assigns a weight to x at each ABR b∈$B_i$. Note that the objective is computing the optimal weights for x under the assumption that no other aggregates covering subnets in x are concurrently being advertized. Also, since the aggregate x is fixed, the subscript $_{\{x\}}$ for W is dropped; thus W(b) denotes the weight assigned to x by ABR b∈$B_i$.

Intuitively, since W(b) is supposed to represent the distance between b and subnets covered by x, two possible logical choices for W(b) are the following:

$$\max_{t\in x}\{lsp(b,t)\}. \qquad 1.$$

$$(1/|x|)\Sigma_{t\in x}lsp(b,t). \qquad 2.$$

The first choice is simply the maximum distance of a subnet in aggregate x from the border router b, while the latter is the average distance of subnets in x from b. Note that, since both choices are independent of the source subnets (not covered by x) and the error to be minimized, as illustrated in the examples below, for most cases, neither choice optimizes the objective error function. In the following two examples, it is shown that choosing W(b) to be $\max_{t\in x}\{lsp(b,t)\}$ minimizes neither the cumulative error nor the maximum error.

Example 2: consider the network in FIG. 1. Suppose one is interested in computing weights for the aggregate 10.1.0.0/21 that covers all the subnets in area 0.0.0.3. If each border router chose the maximum distance to a subnet in 10.1.0.0/21 as the weight for it, $b_3$ assigns 10.1.0.0/21 a weight of 1100 (distance of $b_3$ from 10.1.6.0/24) and $b_4$ assigns to 10.1.0.0/21 a weight of 1250 (distance between $b_4$ and 10.1.6.0/24). Consequently, both subnets 10.1.16.0/24 and 10.1.8.0/24 select the path through ABR $b_3$ to access the subnets in 10.1.0.0/21 which has a cumulative error of 2*0+2*700+2*800=3000 (for 10.1.16.0/24) and 2*0+2*900+2*1000=4800 (for 10.1.8.0/24). In contrast, assigning weights 1000 and 500 to 10.1.0.0/21 at ABRs $b_3$ and $b_4$, respectively, causes the selected paths to be through $b_4$ which results in a much lower cumulative error 2*1300+ 2*0+2*0=2600 (for 10.1.16.0/24) and 2*1100+2*0+2*0=2200 (for 10.1.8.0/24).

Figure 5:
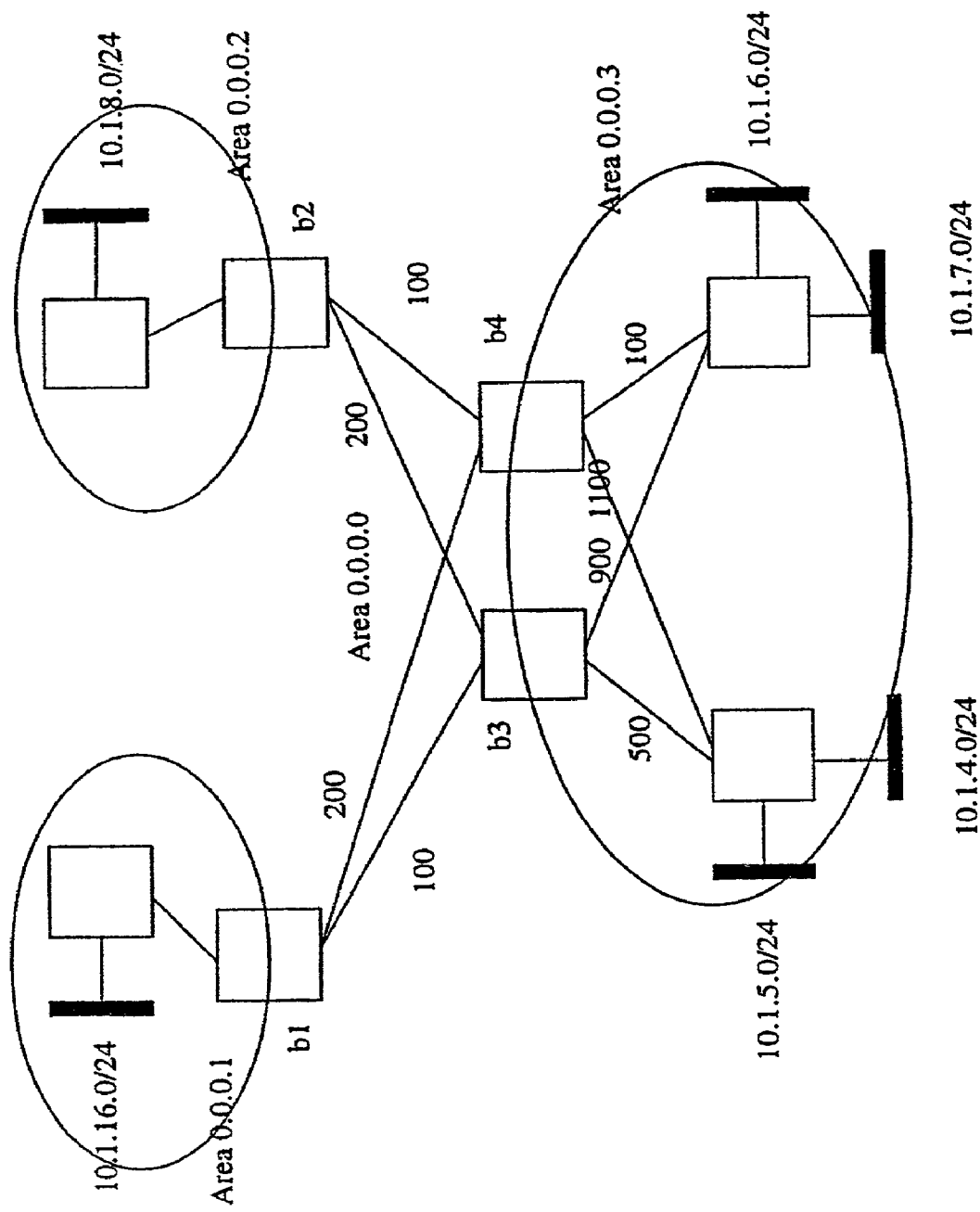
FIG. 5 illustrates an exemplary autonomous network.
Figure 6:
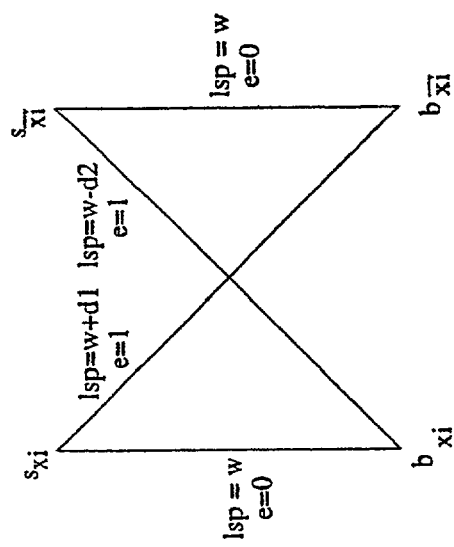
FIG. 6 illustrates a diagram of values of lsp and e for each literal.
Figure 7B:
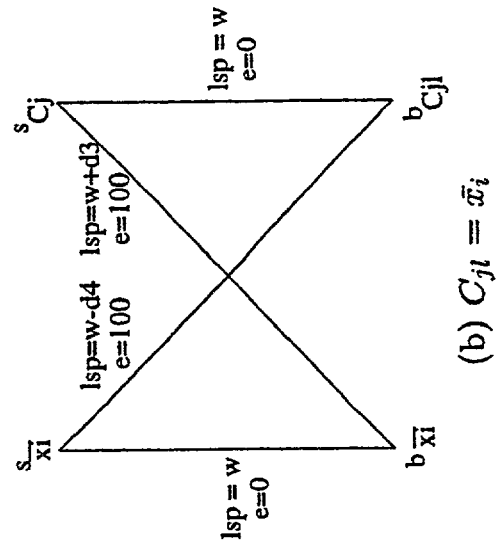
FIGS. 7A and 7B illustrate values of lsp and e for each conjunct.
Figure 7A:
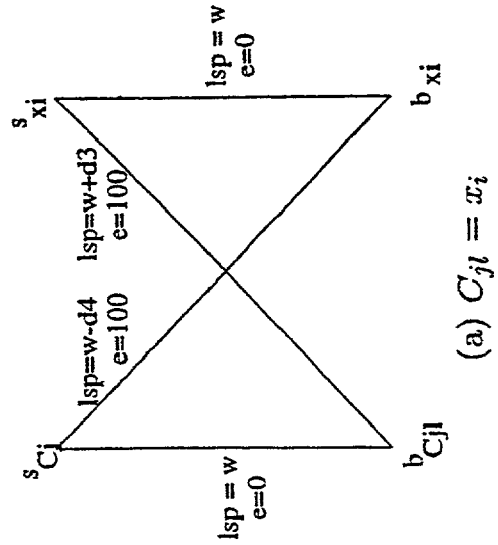

Example 3: consider the network in FIG. 5. Suppose one is interested in computing weights for the aggregate 10.1.0.0/21 that covers all the subnets in area 0.0.0.3. If each border router chose the maximum distance to a subnet in 10.1.0.0/21 as the weight for it, $b_3$ assigns 10.1.0.0/21 a weight of 900 (distance of $b_3$ from 10.1.6.0/24) and $b_4$ assigns to 10.1.0.0/21 a weight of 1100 (distance between $b_4$ and 10.1.4.0/24). Consequently, both subnets 10.1.16.0/24 and 10.1.8.0/24 select the path through ABR $b_3$ to access the subnets in 10.1.0.0/21 which has a maximum error of max{0,700}=700 (for 10.1.16.0/24) and max{0,900}=900 (for 10.1.8.0/24). In contrast, assigning weights 1000 and 500 to 10.1.0.0/21 at ABRs $b_3$ and $b_4$, respectively, causes the selected paths to be through $b_4$ which results in a lower value for maximum error max{700,0}=700 (for 10.1.16.0/24) and max{500,0}=500 (for 10.1.8.0/24).

Choosing $W(b)=(1/|x|)\Sigma_{t\in x}\{lsp(b,t)\}$ yields somewhat better results, because intuitively this is more representative of the distance between b and subnets in x than $max_{t\in x}\{lsp(b,t)\}$. As a matter of fact, setting W(b) to be the average distance of b to subnets in x can be shown to minimize the cumulative error for the weight selection problem. However, it does not optimize the maximum error, as Example 4 illustrates.

Example 4: consider the network in FIG. 1. Suppose one is interested in computing weights for the aggregate 10.1.0.0/21 that covers all the subnets in area 0.0.0.3. If each border router chose the average distance to a subnet in 10.1.0.0/21 as the weight for it, $b_3$ assigns 10.1.0.0/21 a weight of 730 and $b_4$ assigns to 10.1.0.0/21 a weight of 570. Consequently, both subnets 10.1.16.0/24 and 10.1.8.0/24 select the path through ABR $b_4$ to access the subnets in 10.1.0.0/21 which has a maximum error of 1300 for 10.1.16.0/24 and 1100 for 10.1.8.0/24. In contrast, assigning weights 500 and 1000 to 10.1.0.0/21 at ABRs $b_3$ and $b_4$, respectively, causes the selected paths to be through $b_3$ which results in a lower value for maximum error 700 for 10.1.16.0/24 and 900 for 10.1.8.0/24.

The following subsections first show that selecting $W(b)=(1/|x|)\Sigma_{t\in x}lsp(b,t)$ results in the minimum cumulative error and is a solution to the weight selection problem. However, the generalized weight selection problem that involves minimizing the product of the cumulative error of selected paths and their degrees of importance is an $\mathcal{NP}$-hard problem. Consequently, search-based heuristics are presented to solve the generalized weight selection problem and a pseudo-polynomial time technique to solve the weight selection problem when the objective is to minimize the maximum error. Finally, efficient techniques are shown for the generalized weight selection problem when $B_i$ contains only two ABRs.

Problem Formulation

Some of the notation can now be simplified and new terminology can be introduced to address the weight selection problem which is: for an aggregate $x \in A_i$, compute a weight assignment function W, such that $\Sigma_{s\in S, t\in x} lsp(s,t,\{x\}, W) - lsp(s,t)$ is minimum. For each source s, the selected paths to subnets covered by x is through the ABR $b \in B_i$ for which $lsp(s,b)+W(b)$ is minimum (among all the ABRs). The ABR selected for source s is designated by B(s,W). Note that for $t \in x$, $lsp(s,t,\{x\},W)=lsp(s,B(s,W))+lsp(B(s,W),t)$. Further, suppose e(s,b) denotes the error in the selected paths to subnets in x if ABR b is selected for source s. Thus, $e(s,b)=\Sigma_{t\in x}lsp(s,b)+lsp(b,t)-lsp(s,t)$. Then, $e(s,B(s,W))=\Sigma_{t\in x}lsp(s,t,\{x\},W)-lsp(s,t)$, and thus the weight selection problem becomes that of computing a weight assignment W such that $\Sigma_{s\in S}e(s,B(s,W))$ is minimum.

The above problem formulation is for minimizing the cumulative error. If one wishes to minimize the maximum error, then $e(s,b)=max_{t\in x}\{lsp(s,b)+lsp(b,t)-lsp(s,t)\}$ and the weight assignment W must be such that $max_{s\in S}e(s,B(s,W))$ is minimum.

Weight Selection Problem (Cumulative Error)

For the cumulative error case, it can be shown that choosing W(b) to be the average distance of b to subnets in x minimizes the cumulative error in the selected paths between sources and destination subnets in x.

Theorem 3: the weight assignment function W which assigns a weight $W(b)=(1/|x|)\Sigma_{t\in x}lsp(b,t)$ to ABR b results in the minimum value for $\Sigma_{s\in S}e(s,B(s,W))$.

Generalized Weight Selection Problem (Cumulative Error)

For the cumulative error case, $e(s,b)=\Sigma_{t\in x}lsp(s,b)+lsp(b,t)-lsp(s,t)$ is closely related to the criterion for selecting an ABR b for s which is that $lsp(s,b)+W(b)$ is minimum (note that $\Sigma_{t\in x}lsp(s,t)$ is a constant). However, for the generalized cumulative error case, $e(s,b)=\Sigma_{t\in x}D(s,t)*(lsp(s,b)+lsp(b,t)-lsp(s,t))$ and thus e(s,b) can be any arbitrary value based on the value of D(s,t). This fact that e(s,b) can be any arbitrary value makes the problem of computing a weight assignment function W that minimizes $\Sigma_{s\in S}e(s,B(s,W))$ intractable.

Theorem 4: for arbitrary values of e(s,b) and constant E, determining if there exists a weight assignment function W for which $\Sigma_{s\in S}e(s,B(s,W)) \leq E$ is $\mathcal{NP}$-hard.

FIG. 8 illustrates a randomized technique for computing the weights that minimize the cumulative error. The procedure keeps track of the best weight assignment found so far in $W_{min}$, and in each iteration, assigns random weights between 0 and L to some subset of ABRs. Here L is chosen to be a fairly large constant — a reasonable value for L is one or two times the maximum distance between pairs of subnets.

Generalized Weight Selection Problem (Maximum Error)

Recall that, if one is interested in minimizing the maximum error, then $e(s,b)=max_{t\in x}\{lsp(s,b)+lsp(b,t)-lsp(s,t)\}$ and the weight assignment W must be such that $max_{s\in S}e(s,B(s,W))$ is minimum. Thus, one can employ an technique similar to the randomized search technique to compute a weight assignment function that minimizes the maximum error. The only difference is that $\Sigma_{s\in S}e(s,B(s,W))$ should be replaced with $max_{s\in S}e(s,B(s,W))$ in the procedure ComputeWeightsCumulative().

However, one can devise a more efficient pseudo-polynomial technique for computing the weight assignment that minimizes the maximum error. Suppose there exists a procedure P that computes a weight assignment W (if one exists) such that $max_{s\in S}e(s,B(s,W)) \leq E$ for some constant E. Then, a simple procedure for computing the weight assignment that minimizes the maximum error is as follows: (1) Sort the errors e(s,b) between source ABR pairs (let $E_1, \ldots, E_r$ be the errors in order of increasing value), (2) Repeatedly invoke the procedure P for increasing values of i, until P returns a weight assignment W for which $max_{s\in S}e(s,B(s,W)) \leq E_i$. Thus, $E_i$ is the smallest value for which a weight assignment exists and represents the minimum possible value for the maximum error. Further, W is the weight assignment that minimizes the maximum error. Note that instead of considering each $E_i$ sequentially, one can also use a binary search procedure to compute the minimum value for the maximum error more efficiently.

The next task is to develop the procedure P that computes a weight assignment W (if there exists one) such that $max_{s\in S}e(s,B(s,W)) \leq E$ for some constant E. The problem of computing a W such that the maximum error is at most E is equivalent to solving a set of inequalities involving the W(b)s as variables. For a source s, let R denote the set of ABRs $b \in B_i$ for which $e(s,b) \leq E$; thus, for the remaining ABRs $b \in B_i-R, e(s,b)>E$. Consequently, since the error for each source can be at most E, the computed W must be such that one of the ABRs in R is selected for s. For this, W is required to satisfy the following set of inequalities: $min_{b \in R}\{W(b)+lsp(s,b)\} \leq W(c)+lsp(s,c)$ for all $c \in B_i-R$.

Thus, for each source s, the set of inequalities described above is obtained. Note that the Ws in the equations are variables and the lsps are constants. Suppose Q denotes the set of inequalities over all the sources. It is straightforward to observe that, for a W, the maximum error is E if and only if W is a solution for the set of equations Q. Thus, one needs to focus on computing a W that satisfies the inequalities in Q. Observe that, if, for a source s, the set R is empty, then a W for which the set of inequalities Q is satisfiable does not exist. The reason for this is that for the source, inequalities of the form $\min\{\} \leq W(c)+lsp(s,c)$ are obtained which cannot be satisfied since $\min\{\}=1$. Also, no equations are generated for a source s if $R=b_i$ (that is, the error for the source s is at most E irrespective of the chosen ABR).

Procedure ComputeWeightsMax in FIG. 9 is an iterative procedure for computing a W that satisfies Q. In each iteration, a new weight assignment $W_{new}$ is computed after substituting the previous weight assignment $W_{old}$ for the W's only on the LHS of each inequality in Q (Steps 3 and 4). Note that each inequality in Q' has the form $C \leq W(c)+lsp(s,c)$, where C and $lsp(s,c)$ are constants and W(c) is a variable. Also, $lsp_{max}$ is the maximum value for $lsp(s,b)$ for a source ABR pair.

ComputeWeightsMax returns a W that is a solution to Q if and only if Q is satisfiable. In order to show this, in the following lemmas, it is evident that: (1) for any W that satisfies Q, $W_{old}(b) \leq W(b)$ and (2) if Q is satisfiable, then a W exists that is a solution to Q for which $Pb_2 b_i W(b) \leq (jb_i j * (jb_i j - 1)2) * lsp_{max}$. Thus, since $W_{old}$ does not decrease between successive iterations and the procedure terminates only when a W is found or $Pb_2 b_i W_{old}(b)$ becomes greater than $(jb_i j*(jb_i j-1)2)*lsp_{max}$, ComputeWeightsMax computes W correctly.

Lemma 1: for every ABR $b \in b_i$, $Wj+1_{old}(b)*Wj_{old}(b)$.

Lemma 2: for every weight assignment W that is a solution to Q, $W(b)*W_{old}(b)$.

Lemma 3: if Q is satisfiable, then there exists a weight assignment W that is a solution to Q and for which $Pb_2 b_i W(b) \leq (jb_i j * (jb_i j-1)2) *lsp_{max}$.

Theorem 5: if Q is satisfiable, then procedure ComputeWeightsMax returns a weight assignment W that is a solution to Q.

Generalized Weight Selection Problem (2 ABRs)

For the special case when $b_i$ contains only 2 ABRs, $b_1$, and $b_2$, it is possible to devise an efficient technique whose time complexity is O(nlogn) where n is the number of sources. Now comes time to address the problem of computing a weight assignment W such that the cumulative error $\Sigma_{s \in S} e(s,B(s,W))$ is minimized; however, it is straightforward to modify the technique of the present invention to minimize the maximum error.

The error for a source s is $e(s,b_1)$ if $W(b_1)+lsp(s,b_1) \leq W(b_2)+lsp(s,b_2)$ and $e(s,b_2)$ otherwise. For source s, suppose that $v(s)=lsp(s,b_2)-lsp(s,b_1)$ and (without loss of generality) let $v(s1), \ldots, v(sn)$ denote the values in the sorted order. Also, let $s_o$ and $s_{n+1}$ be two dummy sources with zero error to both ABRS, $v(s_0)=-\infty$ and $v(s_{n+1})=\infty$. Then, for $0 \leq j \leq n$, if $v(s_j)<W(b_1)-W(b_2) \leq v(s_{j+1})$ the cumulative error is $\Sigma_{1>j} e(s_1,b_1)+\Sigma_{1 \leq j} e(s_1,b_2)$. Thus, the problem of computing a W reduces to that of computing the $v(s_j)$, $v(s_{j+1})$ pair for which the cumulative error is the smallest.

Procedure ComputeWeightsTwoABR in FIG. 10 computes in variable $V_{opt}$ the upper value of the $v(s_j)$, $v(s_{j+1})$ pair with the minimum cumulative error (that is stored in $E_{opt}$). Variable E in the procedure is used to keep track of the cumulative error for the $v(s_j)$, $v(s_{j+1})$ pair that is currently under consideration in the for loop. Thus, choosing values for $W(b_1)$ and $W(b_2)$ such that $W(b_1)^{3/4} W(b_2)=V_{opt}$ yields the desired weight assignment function W that minimizes the cumulative error.

Although the present invention has been described in detail, those skilled in the art should understand that they can make various changes, substitutions and alterations herein without departing from the spirit and scope of the invention in its broadest form.

What is claimed is:

1. A system for selecting open shortest path first (OSPF) aggregates to advertise, comprising:
 a database configured to include candidate OSPF aggregates and corresponding weights, said candidate OSPF aggregates represented by trees; and
 an aggregate selector, associated with said database, configured to select subsets of each of said trees to reduce an error thereof and combine said subsets to yield a subset to reduce an error associated with said trees, said subset to be advertised by an area border router such that a path length between a particular source and destination subnets selected from advertisement of weights corresponding to said subset approaches a shortest path length between said particular source and destination subnets irrespective of said weights advertised.

2. The system as recited in claim 1 wherein said aggregate selector treats errors in said selected path length as having unequal degrees of importance.

3. The system as recited in claim 1 further comprising:
 a weight assigner, associated with said database, that assigns, for said OSPF aggregates, said weights based on an average distance of subnets in an area to said area border router.

4. The system as recited in claim 3 wherein said weight assigner employs a search heuristic to assign said weights.

5. The system as recited in claim 3 wherein said weight assigner treats errors in path lengths in said area as having unequal degrees of importance.

6. The system as recited in claim 1 further comprising:
 a weight assigner, associated with said database, that employs a search heuristic to assign said weights for said OSPF aggregates.

7. The system as recited in claim 6 wherein said weight assigner treats errors in path lengths in said area as having unequal degrees of importance.

8. A method of selecting open shortest path flint (OSPF) aggregates for advertising, comprising:
 storing data pertaining to candidate OSPF aggregates and corresponding weights, said candidate OSPF aggregates represented by trees;
 selecting subsets of each of said trees to reduce an error thereof; and
 combining said subsets to yield a subset to reduce an error associated withh said trees, said subset to be advertised by an area border router such that a path length between a particular source and destination subnets selected from advertisement of weights corresponding to said subset approaches a shortest path length between said particular source and destination subnets irrespective of said weights advertised.

9. The method as recited in claim 8 wherein said selecting comprises computing a lower bound of error for said candidate OSPF aggregates employing a set of recursive equations.

10. The method as recited in claim 8 further comprising:
 assigning, for said OSPF aggregates, said weights based on an average distance of subnets in an area to said area border router.

11. The method as recited in claim 10 wherein said assigning comprises employing a search heuristic.

12. The method as recited in claim 10 wherein said assigning comprises treating errors in path lengths in said area as having unequal degrees of importance.

13. The method as recited in claim 8 further comprising: employing a search heuristic to assign said weights for said OSPF aggregates.

14. The method as recited in claim 13 wherein said employing comprises treating errors in path lengths in said area as having unequal degrees of importance.

15. An autonomous network domain, comprising:
a plurality of routers and interconnecting segments that cooperate to form subnets and paths therebetween; and
a system for selecting open shortest path first (OSPF) aggregates for advertising, including:
a database for containing candidate OSPF aggregates and corresponding weights, said candidate OSPF aggregates represented by trees, and
an aggregate selector, associated with said database, that selects subsets of each of said trees to reduce an error thereof and combines said subsets to yield a subset to reduce an error associated with said trees, said subset to be advertised by an area border router such that a pat length between a particular source and destination subnets selected from advertisement of weights corresponding to said subset approaches a shortest path length between said particular source and destination subnets irrespective of said weights advertised.

16. The domain as recited in claim 5 wherein said system further includes:
a weight assigner, associated with said database, that assigns, for said OSPF aggregates, said weights based on an average distance of said subnets in said domain to said area border router.

17. The domain as recited in claim 16 wherein said weight assigner employs a search heuristic to assign said weights.

18. The domain as recited in claim 16 wherein said weight assigner treats errors in path lengths in said area as having unequal degrees of importance.

19. The domain as recited in claim 15 wherein said system further comprises:
a weight assigner, associated with said database, that employs a search heuristic to assign said weights for said OSPF aggregates.

20. The domain as recited in claim 19 wherein said weight assigner treats errors in path lengths in said area as having unequal degrees of importance.

* * * * *